United States Patent
Camacho et al.

(10) Patent No.: US 6,467,979 B2
(45) Date of Patent: *Oct. 22, 2002

(54) ERGONOMIC KEYBOARD

(75) Inventors: Herman Camacho, North Hollywood, CA (US); Robert Granadino, Pasadena, CA (US)

(73) Assignee: Metamorfyx, Pasadena, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/178,834

(22) Filed: Oct. 26, 1998

(65) Prior Publication Data

US 2002/0018682 A1 Feb. 14, 2002

Related U.S. Application Data

(63) Continuation of application No. 08/711,179, filed on Sep. 9, 1996, now Pat. No. 5,826,992, which is a continuation of application No. 08/331,688, filed on Oct. 31, 1994, now Pat. No. 5,553,953, which is a continuation of application No. 08/017,106, filed on Feb. 12, 1993, now Pat. No. 5,360,280, which is a continuation-in-part of application No. 07/886,061, filed on May 19, 1992, and application No. 07/900,080, filed on Jun. 17, 1992.

(51) Int. Cl.[7] .................................................. B41J 5/10

(52) U.S. Cl. ...................................... 400/489; 400/715

(58) Field of Search ................................ 400/486, 488, 400/489, 490, 492, 715; D14/115

(56) References Cited

U.S. PATENT DOCUMENTS

| 494,742 A | 4/1893 | Hammond |
| 1,689,283 A | 10/1928 | Granjean |

(List continued on next page.)

FOREIGN PATENT DOCUMENTS

| DE | 552611 | 5/1932 |
| DE | 2725677 | 12/1977 |
| FR | 464907 | 4/1914 |
| FR | 612812 | 11/1926 |
| GB | 298155 | 6/1929 |
| WO | WO 93/07738 | 4/1993 |

OTHER PUBLICATIONS

Michael H. Adler, The Writing Machine a history of the typewriter, published 1973, 381 pages.

Comfort™ Keyboard System Featuring Disc Loc™ Universal Mounts; Comfort™ Keyboard Sales Brochure, Healthcare™ Keyboard Company, Inc., Menomonee Falls, WI Copyright (R) 1992.

(List continued on next page.)

*Primary Examiner*—Stephen R. Funk
(74) *Attorney, Agent, or Firm*—Cook, ALex, Mcfarron, Manzo, Cummings & Mehler

(57) ABSTRACT

An ergonomic keyboard having a mount and a plurality of keys arranged in a plurality of unbroken adjacent rows is provided. Each row is comprised of an arcuate portion, a left portion, and a right portion. The left and right portions extend tangentially from the left and right sides of the arcuate portion, respectively. The arcuate portion, of each row is convex to the user side of the keyboard, and at least two keys in each arcuate portion are elongated. Alphanumeric indicia on the keys can be arranged in the QWERTY pattern.

10 Claims, 1 Drawing Sheet

U.S. PATENT DOCUMENTS

| | | | |
|---|---|---|---|
| 2,318,519 A | | 5/1943 | Palanque |
| 2,369,807 A | | 2/1945 | Solon |
| 3,698,532 A | | 10/1972 | Dodds |
| 4,294,555 A | | 10/1981 | Galaske et al. |
| 4,483,634 A | * | 11/1984 | Frey et al. .................. 400/489 |
| 4,735,520 A | * | 4/1988 | Suzuki et al. ............... 400/488 |
| 4,833,446 A | | 5/1989 | Eilam et al. |
| 4,876,415 A | * | 10/1989 | Clancy ....................... 400/488 |
| 5,029,260 A | | 7/1991 | Rollason |
| 5,040,757 A | * | 8/1991 | Benaway ................... 400/715 |
| 5,059,048 A | | 10/1991 | Sirkin |
| 5,073,050 A | | 12/1991 | Andrews |
| 5,119,078 A | | 6/1992 | Grant |
| 5,120,938 A | | 6/1992 | Rollason |
| 5,122,786 A | | 6/1992 | Rader |
| 5,129,747 A | | 7/1992 | Hutchison |
| 5,145,270 A | * | 9/1992 | Darden ....................... 400/488 |
| 5,156,475 A | | 10/1992 | Zilberman ................. 400/472 |
| 5,228,791 A | | 7/1993 | Fort |
| D339,800 S | * | 9/1993 | Louis ........................ D14/115 |
| 5,244,296 A | | 9/1993 | Jensen |
| 5,302,040 A | * | 4/1994 | Louis ......................... 400/489 |
| 5,305,017 A | | 4/1994 | Gerpheide |
| 5,339,213 A | | 8/1994 | O'Callaghan |
| 5,349,303 A | | 9/1994 | Gerpheide |
| 5,397,189 A | | 3/1995 | Minogue |
| 5,405,204 A | | 4/1995 | Ambrose |
| 5,416,498 A | | 5/1995 | Grant |

OTHER PUBLICATIONS

Horowitz, J.M., Crippled by Computers, Time Magazine, Oct. 12, 1992.

Feder, B.J., Different Strokes for Computing, New York Times, Aug. 9, 1992, p. 9.

Feder, B., Radical Designs for Keyboards, New York Times, Inside: Technology Section, Section F, Sunday, Aug. 9, 1992, p. 9.

* cited by examiner

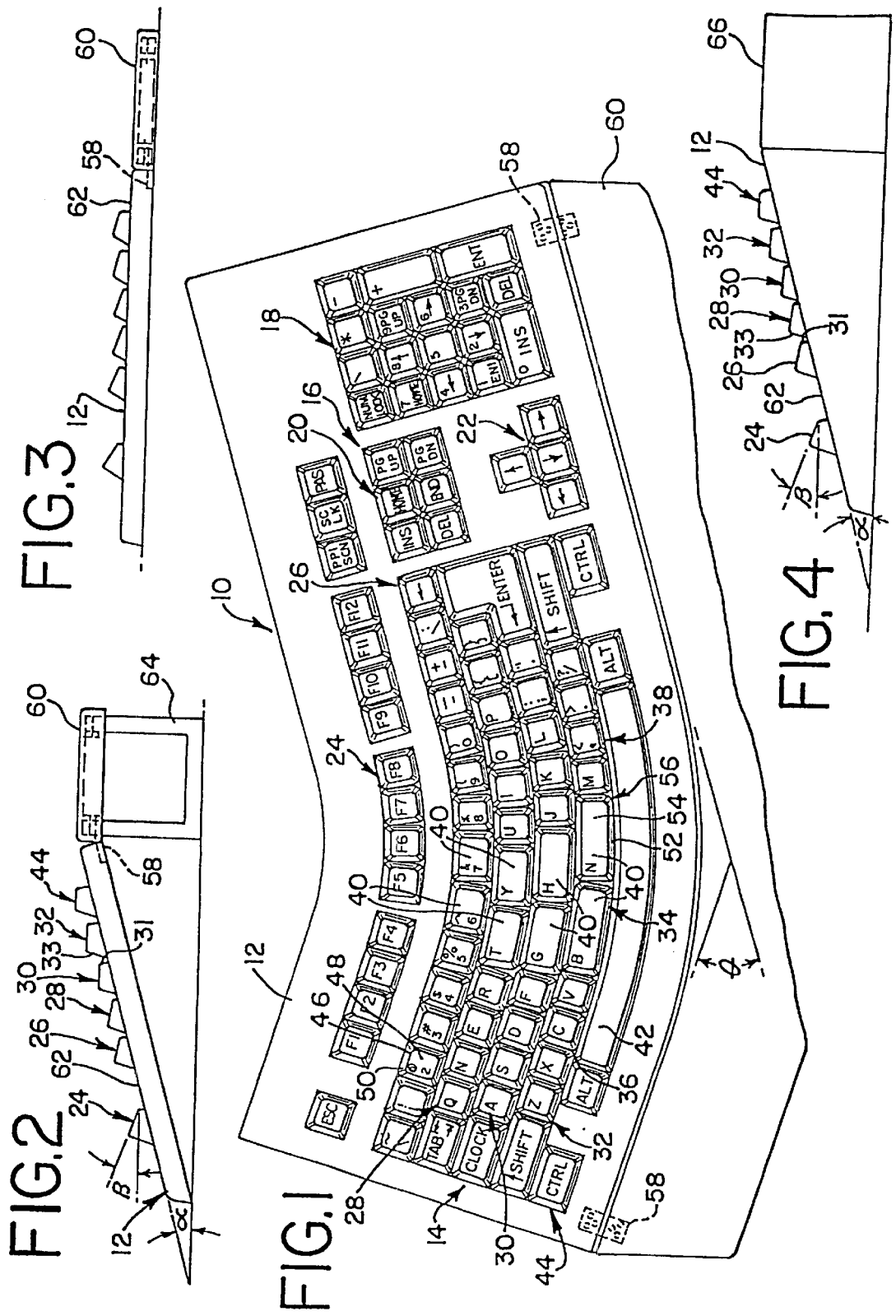

ERGONOMIC KEYBOARD

This is a continuation of U.S. patent application Ser. No. 08/711,179, filed Sep. 9, 1996, now issued as issued U.S. Pat. No. 5,826,992, which is in turn a continuation of Ser. No. 08/331,688, filed Oct. 31, 1994, now issued as U.S. Pat. No. 5,553,953, which is a continuation of U.S. patent application Ser. No. 08/017,106, filed Feb. 12, 1993, now issued as U.S. Pat. No. 5,360,280, which is a continuation in part of application Ser. No. 07/886,061, filed on May 19, 1992, and application Ser. No. 07/900,080, filed on Jun. 17, 1992.

BACKGROUND OF THE INVENTION

1. Field of the Invention

The field of the present invention is keyboards for use with computers, word processors, electric typewriters and the like.

2. Description of the Prior Art

The well known keyboard design that has generally been used for typewriters and computers has four parallel rows of keys. Each row is adjacent to another row, and the rows are located one on top of the other. The top row of keys is numeric, and the bottom three are alphabetical.

Alphanumeric indicia on the keys of the standard keyboard are arranged in a QWERTY design. "QWERTY" stands for the six letters running from left to right in the top row of alphabetical keys.

The keys in each of the four rows are slightly staggered to shorten the distance the finger must travel between keys in adjacent rows. Minimizing the distance the fingers must travel is important because decreased typing speeds and increased error rates result as the distance a finger must travel from its normal, or "home," position increases. Furthermore, longer strokes increase muscle strain and fatigue.

The parallel arrangement of straight rows of keys used in the typical keyboard design requires the hands to be held in a relatively unnatural position. Users must hold their wrists close together and turn their hands outward. Furthermore, elbows are generally pressed against the body. This position forces users to strain muscles from the shoulders to the fingertips in order to keep wrists horizontal to the keyboard and reach all the keys, causing fatigue and strain. To make matters worse, many typists, working at computer stations, position their hands over the keyboard with the sensitive wrist cocked upward or downward, compressing the tendons, ligaments and nerves that run through the narrow confines of the wrist.

Frequent users of standard keyboards are often afflicted with a serious repetitive stress injury (RSI) known as carpal tunnel syndrome. This disease is the long term result of irritation and inflammation of the median nerve and is caused by maintaining the fingers, hands, wrists, and arms in the unnatural position required to use the standard QWERTY keyboard. Carpal tunnel syndrome and other related RSI injuries have resulted in lost productivity, rising insurance and worker's compensation claims, and, more recently, a rise in product liability suits against keyboard manufacturers.

There have been attempts to redesign keyboards to allow users to assume more natural wrist and hand positions while typing. One such approach has been to bend the rows of keys in the middle to form a V-shaped arrangement. This arrangement is less fatiguing because it allows operators to turn their wrists outward somewhat so that their hands are held more directly in line with their forearms.

A problem with existing V-shaped, or "chevron", keyboards is that most of them do not use the standard QWERTY key arrangement. Therefore, existing chevron arrangements must be relearned by a typist whose only prior training and experience is usually on QWERTY keyboards. Furthermore, many chevron keyboards have such large gaps between the keys on alternate sides of the keyboard that they cannot be readily modified for use by a QWERTY trained typist. Also, chevron keyboards are not generally suitable when it is desired to minimize the typing area, for example, a laptop, notebook or pocket computer. And while the chevron design permits the wrists to be held in a more natural position, the elbows are still generally maintained close to the body because of the geometry of the keyboard. Thus, the upper portion of the arm and shoulders remain in a strained position.

Another general problem with V-Shaped boards of the prior art is that they fail to prevent users from cocking their wrists upwardly or downwardly while typing. Thus, even with V-shaped or chevron shaped keyboards the tendons, ligaments and nerves-that run through the narrow confines of the wrist can continue to be compressed and cause the operator to suffer RSI.

Chevron boards that have attempted to use the standard QWERTY key arrangement have not been entirely successful. The shape of the keys in the center section of the keyboard must be altered in specific ways to accommodate the chevron pattern and to provide an interlocking arrangement between the rows of keys at the center, where the angle is formed. Namely, the base perimeters of three keys (the U key, the B key, and the space bar) must be formed into chevrons, and the base perimeter of four keys (the 6 key, the 7 key, the G key, and the H key) must be formed into irregular trapezoids. Increased complexity in the key shapes causes a corresponding increase in the set up costs for manufacturing the key board. Also, the angle of finger throw in these keyboards is different than that of a standard QWERTY keyboard, and no symmetry exists in the amount the keys are staggered on each side of the keyboard center. Thus, QWERTY-trained operators will experience increased error rates until they gain complete tactile familiarity with the shifted keys.

Therefore, a need exists for an improved ergonomic keyboard that maintains the wrists and elbows in a more natural position and that may be picked up by a QWERTY trained typist without having to change their typing style or the angle of their finger throw when striking keys in adjacent rows.

SUMMARY OF THE INVENTION

The present invention is directed to an improved ergonomic keyboard designed to satisfy or at least diminish the aforementioned needs. To this end, a plurality of keys are arranged on a mount in a number of adjacent arcuate-shaped rows. At least two elongated keys are located in the arcuate portion of each row, and in order to provide an interlocking arrangement between the rows, the elongation of the elongated keys is increased as the rows approach the user side of the keyboard.

The arcuate arrangement of this invention allows the hands to be held more directly in line with the forearms; thus, eliminating the problem of the wrists being turned outward in the lateral plane. Further, the elongated keys in the arcuate portion of the board effectively increase the distance between the hands so that the arms are held in a natural, relaxed position rather than being held in close to the body. And while the keyboard arrangement of the present invention may be used for the usual QWERTY-keyboard arrangement, it is not so limited.

In another aspect of the present invention, the upper surface of the keyboard mount is made to slope downwardly in a direction away from the user side of the keyboard. The downward sloping typing surface may be provided by directly molding it into the keyboard. More desirably, the keyboard may be provided with a wrist support pivotally attached to the mount and support legs that are pivotally attached to the wrist support. With this arrangement, the upper surface of the mount can be made to slope downwardly in a direction away from the user by lowering the legs on the wrist support.

The downwardly sloping configuration of the keyboard helps prevent users from resting their wrists on the table, a common occurrence with fatigued typists. Furthermore, the wrist support, in combination with the downward slope of the keyboard, prevents users from cocking their wrists in the vertical plane while typing.

In a preferred embodiment of the present invention, an ergonomic keyboard is provided having a plurality of keys arranged on a mount in a number of adjacent arcuate-shaped rows. At least two elongated keys are located in the arcuate portion of each row, and in order to provide an interlocking arrangement between the rows, the elongation of the elongated keys is increased as the rows approach the user side of the keyboard. Furthermore, the upper surface of the keyboard mount is made to slope downwardly in a direction away from the user side of the keyboard. The downward sloping typing surface may be provided by directly molding it into the keyboard, or, preferably, the keyboard may be provided with a wrist support pivotally attached to the mount and support legs that are pivotally attached to the wrist support. With the second arrangement, the upper surface of the mount may be made to slope downwardly in a direction away from the user by lowering the legs on the wrist support.

In this preferred embodiment, the keyboard achieves the advantages of both the arcuate-shaped keyboard and the downwardly sloping keyboard discussed above.

Accordingly, it is an object of the invention to provide an improved ergonomic keyboard.

Other novel features that are characteristic of the invention, as to organization and method of operation, together with further objects and advantages thereof will be better understood from the following description considered in connection with the accompanying drawings in which the embodiments of the present invention are illustrated by way of example. It is to be expressly understood, however, that the drawings are for the purpose of illustration and description only and are not intended as limitations on the invention.

BRIEF DESCRIPTION OF THE DRAWINGS

FIG. 1 is a partial top plan view of a preferred keyboard of the invention.

FIG. 2 is a left end view of the preferred keyboard shown in FIG. 1 with support legs in the down position.

FIG. 3 is a left view of the preferred keyboard in FIG. 1 with support legs in the up position.

FIG. 4 is a second embodiment of the keyboard shown in FIG. 1.

DETAILED DESCRIPTION OF THE PREFERRED EMBODIMENTS

Keyboard arrangements of the present invention are adapted to be used at normal typing stations of suitable height without special recesses. Furthermore, the arrangement of keys of the present invention permits the hands, wrists, elbows and shoulders to be maintained in ergonomically advantageous orientations.

FIG. 1 shows the preferred proportions and relative sizes of advantageous keyboard arrangement according to the present embodiment. Referring to FIG. 1 keyboard 10 comprises several distinct groups of keys. Each group of keys is supported on the keyboard mount 12. Mount 12 may be made from metal or plastic. Plastic, however, is the preferred construction material because it is less expensive and easy to mold.

The alphanumeric key group 14 is located to the left side of keyboard 10. On the right side of keyboard 10 is located a main cursor group 16 and a numeric/cursor keypad group 18. The numeric/cursor keypad group 18 is located to the right of the main cursor group 16.

Cursor group 16 is made up of an area-by-area cursor movement subset 20 and a space-by-space movement subset 22. Also, as is well known in the art, insert (Ins) and delete (Del) keys are added to the area-by-area subset.

A computer function key group 24 (or "function key" row) is located across the top of the keyboard 10. The function key group can be generally arranged in an arcuate shape similar to that of the alphanumeric key group 14 as illustrated in FIG. 1. Alternatively, the function keys can be arranged in a straight-line across the top of the keyboard 10.

The alphanumeric indicia on the keys in group 14 are arranged in the common QWERTY pattern, which is well known in the art. Thus, other than the arcuate shape in the center portion of the alphanumeric key group 14, the general configuration of the keyboard is similar to that which is commonly referred to as an enhanced computer keyboard, which includes the typical a, b, c, ... and 1, 2, 3, ... keys, function keys, cursor keys, a keypad, and the other keys commonly used as part of a computer terminal. Some of the other keys that are typically included in the enhanced computer keyboard, as is well known in the art, are illustrated in FIG. 1. Examples include Print Screen (Prt Scn), Scroll Lock (Sc Lk), Pause (Pas), and Escape (Esc). Obviously, however, keyboard 10 may include as many or as few keys as desired for the particular circumstances.

Every key on keyboard 10 is connected to a means for electrically signaling the computer, word processor or electric typewriter the key that has been struck. The means for creating the electrical signal and the means for connecting the keys to mount 12 are well known in the art and need not be described herein.

The alphanumeric group 14 basically comprises 58 keys: 10 numeric keys, 26 alphabetical keys, one for each letter of the alphabet, and 22 miscellaneous keys. The 22 miscellaneous keys include keys for punctuation and such controls as Shift, Space, Tab, Control (Ctrl), Alternate (Alt) and the like.

Key 46, which is the 2 key, is typical of the majority of alphanumeric keys. It has a rectangular (or square) base perimeter 50. The base perimeter 50 tapers upwardly to a slightly concave upper surface 48 of reduced size. The general shape of the key is a truncated pyramid or an irregular truncated pyramid depending on whether all four sides of the key taper upwardly or only three of the four sides taper upwardly to upper surface 48. Both of these shapes, however, are known in the art.

Alphanumeric group 14 consists of four unbroken rows, one numeric and three alphabetic. Numeric row 26 contains the arabic numerals and some punctuation and symbol keys. The three alphabetic rows comprise a first or "top" row 28, a second or "home" row 30, and a third or "bottom" row 32.

Each unbroken row of keys is comprised of an arcuate portion 34, a left portion 36, and a right portion 38. The left and right portions extend tangentially from the left and right sides of the arcuate portion, respectively. The angle $\theta$ in FIG. 1 represents the lateral curvature of the arcuate portion of the keyboard. Preferably, $\theta$ is 35°.

The arcuate portion of each row is convex to the user side of the keyboard and is comprised of at least two elongated keys 40. In the QWERTY design of the present embodiment, the elongated keys are namely, the 6 and 7 in the "numeric" row, the T and Y in the "top" row, the G and H in the "home" row, and the B and N in the "bottom" row.

Elongated keys 40 have a rectangular base perimeter 52, which is wider than that for the typical alphanumeric key 46. The rectangular base perimeter tapers upwardly to a slightly concave upper surface 54 of a reduced size as with key 46. Thus, other than the width, the dimensions of elongated keys 40 and alphanumeric key 46 are the same. Similarly, the angle at which the base perimeter tapers upwardly to the upper surface of reduced size is identical.

Alternatively, elongated keys 40 can be shaped such that the base perimeter and upper surface have a trapezoid shape or an arcuate shape. The advantage of these shapes is that the gaps between adjacent keys in the same row are kept as small as possible. This is because the gap 56 formed by adjacent keys in the arcuate portion of the rows is rectangular. Whereas, when elongated keys 40 have a rectangularly shaped base perimeter, the gap between adjacent keys in the arcuate portion of the board is triangularly shaped, as illustrated in FIG. 1, thus allowing slightly larger foreign objects to enter the area beneath the keys.

These shapes are still much simpler, and thus cheaper to manufacture, than the chevron shaped keys and the irregular trapezoid shaped keys required for existing V-shaped boards having interlocking rows.

The elongation of the elongated keys 40 increases as the rows approach the user side of the keyboard 10. Therefore, the elongation of elongated keys 40 in the "bottom" row is greater than that of the elongated keys in the "home" row, "top" row, or "numeric" row.

Increasing the elongation of elongated keys 40 as the rows approach the user side of the keyboard provides several benefits.

First, the key stagger between adjacent rows can be maintained substantially similar to that of a standard QWERTY keyboard, which also means that the key stagger is symmetrical on the left and right sides of they keyboard. The only area where there is a slight change in the key stagger is the arcuate portion of the keyboard. However, because the keys in this portion of the board are all operated by the index fingers, the most agile of all the fingers, operators will experience no difficulty locating or striking these keys. A QWERTY-typist, therefore, will find the distance and angle of finger throw substantially identical to that of the standard keyboard, and most will experience immediate tactile familiarity with the keyboard according to the present invention. Accordingly, the keyboard according to the present embodiment is an acceptable substitute in the work place because no additional training is required.

Second, the elongated keys in the arcuate portion of the keyboard effectively increase the distance between the hands. As a result, the arms are held in a more natural, relaxed position than when using a standard keyboard or existing chevron boards having interlocking rows. Operators of these prior art keyboards tend to hold their elbows in close to the body. Whereas, the elbows are naturally held out away from the body with keyboards according to the present embodiment. This facilitates ergonomic movement of the arms when striking distant keys. Distant computer keys should be reached by moving the entire arm, starting from the shoulders, rather than by twisting the wrists or straining the fingers. However, if the elbows are held in close to the body, the operator's own girth is more likely to hinder proper movement when striking distant keys.

At the bottom of the arcuate-shaped rows is a space bar key 42 having an arcuate-shape matching that of the arcuate-shaped rows of alphanumeric key group 14. Opposed pairs of Ctrl and Alt keys are at each end of the space bar key 42. The space bar key 42 plus the other keys in the same row as the space bar form the "space bar" row 44.

In the preferred embodiment of the present invention, a wrist support 60 is pivotally attached to mount 12 of keyboard 10 by a pair of hinges 58, and as shown in FIG. 2, a pair of retractable support legs 64 are pivotally attached to wrist support 60. Furthermore, as also shown in FIG. 2, when support legs 64 are in a down position, the upper surface 62 of mount 12 slopes downwardly in a direction away from the user. However, as shown in FIG. 3, when the retractable support legs are in the up position, mount 12 lies flat on the typing surface. "Stilt-legs," which are commonly located on the bottom of standard computer keyboards and which flip up or down to raise and lower the angle at which one types, may be used for legs 64.

The angle $\alpha$ in FIG. 2 represents the angle at which the upper surface 62 slopes downwardly. When support legs 64 are in the down position, the upper surface 62 of mount 12 should slope downwardly at an angle from approximately 5° to 40°. Preferably the downward slope should range from approximately 15° to 25°.

The downwardly sloping configuration of the keyboard helps prevent users from resting their wrists on the table, a common occurrence with fatigued typists. Furthermore, the wrist support in combination with the downward slope of the keyboard, prevents users from cocking their wrists in the vertical plane while typing. As a result, the sensitive tendons, ligaments, and nerves that run through the narrow confines of the wrist remain in their natural position and are not compressed or irritated while typing. This greatly reduces the likelihood that the operator will be afflicted with a repetitive stress injury when typing for long periods of time.

An alternative embodiment is illustrated in FIG. 4. In this embodiment, the downwardly sloping upper surface 62 is directly molded into mount 12. Thus, the angle at which the keyboard slopes downwardly away from the user is permanently fixed.

As with FIG. 2, the angle $\alpha$ represents the angle at which the upper surface 62 of mount 12 slopes downwardly. The upper surface 62 of mount 12 should slope downwardly at an angle from approximately 5° to 40°. Preferably the downward slope should range from approximately 15° to 25°.

Wrist support 66 is positioned adjacent to the keyboard on the high side of the downwardly sloping mount 12, which is also the user side of the keyboard. Wrist support 66 can be manufactured separate from mount 12 or it can be molded directly into mount 12.

An advantage of the embodiment depicted in FIGS. 2 and 3 over the one shown in FIG. 4 is its compact nature. Thus, the preferred embodiment shown in FIGS. 2 and 3 is more appropriate for portable and laptop computers.

Standard QWERTY keyboards can also be manufactured with a downwardly sloping upper surface. Of course, such keyboards would not achieve the additional ergonomic benefits derived form having an arcuate-shaped keyboard.

As illustrated in FIGS. 2 and 4, the concave stroking surface of the keys within a row lie in a common oblique plane that slopes upwardly in a direction away from the user side of the keyboard. Each row of keys should be sloped such that the back of the keys 31 are lower than the front of the keys 33 in the adjacent row on the user side of the keyboard. Furthermore, each row of keys should have an upward slope greater than or equal to 0°, and the further a row of keys is from the user side of the keyboard, the greater its upward slope should be. Thus, the upward slope of the keys in the "space bar" row 44 is less than the slope of the keys in the "bottom" row 32, "home" row 30, "top" row 28, "numeric" row 26 or "function key" row 24.

The angle at which a particular row of keys slopes upwardly is measured from the horizontal axis as illustrated by the angle β in FIGS. 2 and 4. For the preferred embodiment illustrated in FIGS. 2 and 3, the slope of the keys is determined when the retractable support legs 64 are in the down position. The following is a list of the preferred angles at which each row of keys slopes upwardly: "space bar" row 44 - - - 0°; "bottom" row 32 - - - 3°; "home" row 30 - - - 6°; "top" row 28 - - - 6°; "numeric" row 26 - - - 9°; and "function key" row 24 - - - 15°.

Sloping the keys in this manner improves the angle of contact between the keys and the operator's fingers. Thus, an operator's fingers are less likely to miss the object key or to carom off one key into another. Error rates are thereby minimized.

While the principles of the invention have been made clear in the illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. Thus, it is to be clearly understood that this description is made only by way of example and not as a limitation to the scope of the invention as claimed below.

We claim:

1. An ergonomic keyboard, comprising:
   a mount;
   a plurality of keys located on said mount and arranged in a plurality of adjacent arcuate-shaped rows; and
   at least two elongated keys located in an arcuate portion of each row.

2. An ergonomic keyboard as defined in claim 1, further including a wrist support attached to said mount.

3. An ergonomic keyboard as defined in claim 2, further including at least one adjustable support member attached to said mount.

4. An ergonomic keyboard as defined in claim 1, wherein said plurality of keys are arranged in at least one unbroken row comprised of the arcuate portion, a left portion and a right portion, said left and right portions extending tangentially from the left and right sides of the arcuate portion, respectively, and said arcuate portion of said at least one unbroken row being convex to a front edge of the keyboard.

5. An ergonomic keyboard as defined in claim 1 wherein the elongation of said elongated keys is increased as the rows approach a user.

6. An ergonomic keyboard supportable on an underlying support surface, said keyboard comprising:
   a housing having a top surface and a bottom surface, a front edge closest to a user and a rear edge;
   said housing including a wrist support on said top surface extending along said front edge; and
   a plurality of keys on said top surface arranged in a number of adjacent arcuate-shaped rows wherein at least two of said keys in an arcuate portion of each row are elongated.

7. An ergonomic keyboard as defined in claim 6, further including at least one adjustable support member attached to and extending from said keyboard housing to said support surface for elevating said wrist support relative to said support surface.

8. An ergonomic keyboard as defined in claim 6, wherein said plurality of keys are arranged in at least one unbroken row comprised of the arcuate portion, a left portion and a right portion, said left and right portions extending tangentially from the left and right sides of the arcuate portion, respectively, and said arcuate portion of said at least one unbroken row being convex to a front edge of the keyboard.

9. An ergonomic keyboard supportably by an underlying support surface, said keyboard comprising:
   a housing having a top surface and a bottom surface, a front edge closest to a user and a rear edge;
   a plurality of keys on said top surface arranged in a number of adjacent arcuate-shaped rows wherein at least two of said keys in an arcuate portion of each row are elongated; and
   an adjustable support member attached to and extending from said housing to said support surface for altering the slope of said housing relative to said underlying support surface.

10. An ergonomic keyboard as defined in claim 9, wherein a number of said keys have a key top surface being sloped generally downward from said rear edge of said housing to said front edge of said housing relative to the support surface when the keyboard is in use.

* * * * *